UNITED STATES PATENT OFFICE.

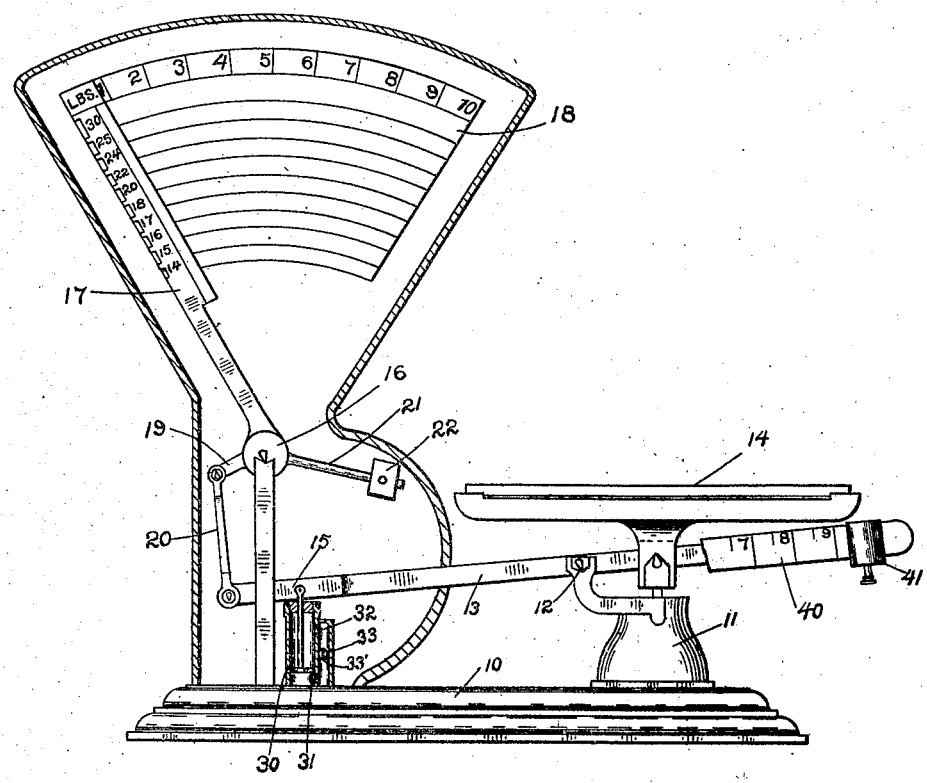

FRANK P. DUNN, OF ANDERSON, INDIANA, ASSIGNOR OF ONE-FOURTH TO GEORGE P. LOUISO, ONE-FIFTH TO HENRY F. DUNN, ONE-EIGHTH TO MARTIN DUNN, AND ONE-EIGHTH TO EDWARD W. LOUISO, ALL OF ANDERSON, INDIANA.

SCALE.

REISSUED

No. 856,998. Specification of Letters Patent. Patented June 11, 1907.

Application filed November 19, 1906. Serial No. 344,018.

*To all whom it may concern:*

Be it known that I, FRANK P. DUNN, a citizen of the United States, residing at Anderson, in the county of Madison and State of Indiana, have invented certain new and useful Improvements in Scales, of which the following is a specification.

The object of my invention is to produce an automatically operating scale, the parts coming to balance under loads of different amounts by reason of the automatic shifting of a counter-balance, the effect of which upon the scale-beam varies inversely as the applied weight.

The accompanying drawing, which is a side elevation in partial vertical section, illustrates my invention.

In the drawing 10 indicates a suitable base having a fulcrum standard 11 provided with suitable knife edges 12 upon which the main beam 13 is fulcrumed, said main beam carrying platform 14 on its shorter arm. Beam 13 at its outer end is weighted at 15, for a purpose which will appear.

Pivoted upon suitable knife edges above the outer end of beam 13 is a shaft 16 which carries a pointer arm 17 adapted to traverse the usual computing scale 18. Shaft 16 also carries a pair of arms 19—19 which normally incline downwardly and this arm is connected with the outer end of the beam 13 by means of a link 20, suitable knife-edge connections being made between the link, beam 13, and arms 19, in a well known manner. Extending from shaft 16 in opposition to arms 19 is an arm 21 which carries an adjustable balance weight 22. The normal position of arm 21 is swung from the vertical, so that weight 22 is normally in an unstable position, having a continuous tendency to fall. Weight 22 and the weighted end 15 of beam 13 are so proportioned that, with the parts in the positions shown in the drawing, a weight of, say 10 pounds, upon the platform 14 is necessary to bring the beam to balance at the limit of its weighing movement, with weight 22 in its most stable position, i. e., directly beneath shaft 16. The weight 15 also bears such relation to weight 22 that when said weight 22 is in its maximum position, and therefore exerting its maximum turning force upon said shaft and its maximum lift upon the beam 13, the scale will be in balance with the finger 17 at the initial end of the computing scale.

If now a weight of less than 10 pounds be put upon the platform, the counterbalance 22 being, when combined with the load placed upon the platform, more than enough to balance the weighted beam, will descend until it reaches a position where its effective lift upon the scale beam has decreased a sufficient amount to bring the parts to a balance. It will be noticed, therefore, that the counterbalance 22 is initially in a position to move in a direction affecting the scale beam in the same way that the applied load affects the scale beam and that, as the applied load affects the scale beam, the counterbalance gradually decreases in effect upon the scale beam until the parts come to a balance. The added load, therefore, causes a movement of the counterbalance in the direction in which gravity continually tends to move it. The scale is, therefore, exceedingly sensitive.

In order to check oscillations of the indicator arm, I provide a novel dash-pot for the scale beam. The dash pot consists of the main cylindrical chamber 30 in which is reciprocably mounted a piston 31 hung from the scale beam 13. The upper and lower ends of the dash pot 30 are connected by a passage 32 in which is mounted a valve 33 which serves to adjust the by-pass opening and thus control the flow of fluid from one side of the piston to the other. A convenient form of valve is that shown in the drawing where the valve stem is threaded into the casing but at its inner end is formed into a flat plate 33' which, by a quarter turn of the screw, may be turned from maximum opening so as to lie across the by-pass to entirely close the same.

As is usual with scales of this character the beam 13 may be provided with a suitable tare beam 40 having a proper tare weight 41 adjustable thereon.

I claim as my invention:

1. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act until equilibrium upon the scale beam in the direction of applied load with a variable force as the counterbalance approaches or recedes from its normal position, and means for indicating the position of equilibrium of the scale beam under an applied load, whereby the effect of such applied load is indicated.

2. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act until equilibrium upon the scale in the direction of applied load with a variable force diminishing as the counterbalance approaches a lower position, and means for indicating the position of equilibrium of the beam under an applied load, whereby the effect of said applied load is indicated.

3. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act until equilibrium upon the scale in the direction of applied load with a variable force as the counterbalance approaches or recedes from its normal position, an indicator scale, and an indicator connected to the scale beam to move therewith and traverse the scale, whereby the various positions of equilibrium of the structure under different applied loads may be indicated to indicate the effect of the particular applied load.

4. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act upon the scale in the direction of applied load with a variable force diminishing as the counterbalance approaches a lower position, an indicator scale, and an indicator connected to the scale beam to move therewith and traverse the scale.

5. In a scale, the combination with a pivoted beam adapted to receive a load on one end and having a normally weighted opposite end to oppose an applied load, of a rockshaft, an arm carried by said shaft and connected to the scale beam, a counterweight arm carried by said shaft in a normally raised position, a counterweight on said arm to act until equilibrium upon the scale beam in the direction of applied load, and means for indicating the position of equilibrium of the beam under an applied load, whereby the effect of said applied load is indicated.

6. In a scale, the combination with a pivoted beam adapted to receive a load on one end and having a normally weighted opposite end to oppose an applied load, of a rockshaft, an arm carried by said shaft and connected to the scale beam, a counterweight arm carried by said shaft in a normally raised position, a counterweight on said arm to act upon the scale beam in the direction of applied load, an indicator scale, and an arm carried by the rock shaft and traversing the scale.

7. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act upon the scale beam in the direction of applied load with a variable force as the counterbalance approaches or recedes from its normal position, a dash pot having a passage forming a connection between its ends, a rotatable valve mounted in said passage and having a portion adapted to lie parallel with the passage or transversely across the same, and a piston mounted in the dash pot and connected with the scale beam.

8. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act upon the scale in the direction of applied load with a variable force diminishing as the counterbalance approaches a lower position, a dash pot having a passage forming a connection between its ends, a rotatable valve mounted in said passage and having a portion adapted to lie parallel with the passage or transversely across the same, and a piston mounted in the dash pot and connected with the scale beam.

9. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act upon the scale in the direction of applied load with a variable force as the counterbalance approaches a lower position, an indicator scale, an indicator connected to the scale beam to move therewith and traverse the scale, a dash pot having a passage forming a connection between its ends, a rotatable valve mounted in said passage and having a portion adapted to lie parallel with the passage or transversely across the same, and piston mounted in the dash pot and connected with the scale beam.

10. In a scale, the combination with a pivoted beam adapted to receive a load on one end, and having a normally weighted opposite end to oppose an applied load, of a counterbalance normally in a raised position, a connection between said counterbalance and the scale beam whereby said counterbalance will act upon the scale in the direction of applied load with a variable force diminishing as the counterbalance approaches a lower position, an indicator scale, an indicator connected to the scale beam to move therewith and traverse the scale, a dash pot having a passage forming a connection between its ends, a rotatable valve mounted in said passage and having a portion adapted to lie parallel with the passage or transversely across the same, and a piston mounted in the dash pot and connected with the scale beam.

11. In a scale, the combination with a pivoted beam adapted to receive a load on one end and having a normally weighted opposite end to oppose an applied load, of a rockshaft, an arm carried by said shaft and connected to the scale beam, a counterweight arm carried by said shaft in a normally raised position, a counterweight on said arm to act upon the scale beam in the direction of applied load, a dash pot having a passage forming a connection between its ends, a rotatable valve mounted in said passage and having a portion adapted to lie parallel with the passage or transversely across the same, and a piston mounted in the dash pot and connected with the scale beam.

12. In a scale, the combination with a pivoted beam adapted to receive a load on one end and having a normally weighted opposite end to oppose an applied load, of a rockshaft, an arm carried by said shaft and connected to the scale beam, a counterweight arm carried by said shaft in a normally raised position, a counterweight on said arm to act upon the scale beam in the direction of applied load, an indicator scale, an arm carried by the rock shaft and traversing the scale, a dash pot having a passage forming a connection between its ends, a rotatable valve mounted in said passage and having a portion adapted to lie parallel with the passage or transversely across the same, and a piston mounted in the dash pot and connected with the scale beam.

13. In a scale, the combination with a pivoted beam adapted to receive a load on one end and having a normally weighted opposite end to oppose an applied load, of a counter-balance normally in a raised position, a connection between said counter-balance and the scale beam whereby said counter-balance will act until equilibrium upon the scale beam in the direction of an applied load with a force varying as the counter-balance approaches or recedes from its normal raised position, and means connected with said mechanism for automatically indicating the position of equilibrium under a given applied load and thereby indicating the effect of such load upon the structure.

14. In a scale, the combination with a pivoted beam adapted to receive a load on one end and having a normally weighted opposite end to oppose an applied load, of a rotative indicator support, an indicator, a scale traversed by said indicator, a connection between the indicator support and the scale beam, a counterweight arm carried by said indicator support in a normally raised position, a counterweight on said arm to act upon the scale beam in the direction of the applied load, and means connected to said scale connected to one of the movable parts of said structure to regulate the vibration of the beam.

In witness whereof, I, have hereunto set my hand and seal at Anderson, Indiana, this 15th day of November, A. D. one thousand nine hundred and six.

FRANK P. DUNN. [L. S.]

Witnesses:
 PEARLE J. WARDEN,
 J. A. WERTZ.